(12) United States Patent
Fondberg et al.

(10) Patent No.: US 9,544,630 B2
(45) Date of Patent: Jan. 10, 2017

(54) METHOD AND IPTV SERVER FOR ENABLING PLAYOUT OF ONE OR MORE MEDIA OBJECTS

(75) Inventors: Niklas Fondberg, Enskede (SE); Mats Cedervall, Härnösand (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 15 days.

(21) Appl. No.: 14/370,504

(22) PCT Filed: Jan. 24, 2012

(86) PCT No.: PCT/SE2012/050061
§ 371 (c)(1),
(2), (4) Date: Jul. 3, 2014

(87) PCT Pub. No.: WO2013/112081
PCT Pub. Date: Aug. 1, 2013

(65) Prior Publication Data
US 2015/0026746 A1     Jan. 22, 2015

(51) Int. Cl.
H04N 7/173       (2011.01)
H04N 21/2668    (2011.01)
(Continued)

(52) U.S. Cl.
CPC ...... *H04N 21/2668* (2013.01); *H04L 65/4084* (2013.01); *H04L 65/80* (2013.01);
(Continued)

(58) Field of Classification Search
CPC ............ H04N 21/2668; H04N 21/2393; H04N 21/2387; H04N 21/23106; H04N 21/6175; H04N 21/4126; H04N 21/6543; H04N 21/6125; H04N 21/6581; H04N 21/4331; H04N 21/2407; H04N 21/25833; H04N 21/47202; H04N 21/8586; H04N 21/64322
(Continued)

(56) References Cited

U.S. PATENT DOCUMENTS 7,721,315 B2 *  5/2010  Brown ............... H04N 7/17336
                                                             725/109
7,877,525 B1 *  1/2011  Sun .................... H04L 65/4084
                                                             709/217

(Continued)

FOREIGN PATENT DOCUMENTS

AU     2010100616 A4    7/2010
WO       03096669 A2    5/2003
(Continued)

OTHER PUBLICATIONS

Gan, C., et al., "A novel prebuffering scheme for IPTV service", Computer Networks, Jul. 28, 2009, vol. 53, Issue 11, pp. 1956-1966.
(Continued)

*Primary Examiner* — Nasser Goodarzi
*Assistant Examiner* — Michael B Pierorazio
(74) *Attorney, Agent, or Firm* — Patent Portfolio Builders, PLLC (57) ABSTRACT

A method and an IPTV server (302) for enabling playout of one or more media objects for a subscriber. A current connection state and capabilities are maintained in the IPTV server for a set of devices (304, 304a) associated to the subscriber. The IPTV server further sends (3:3) a list of the devices to a first device (300), comprising current connection states of the devices. When the IPTV server receives from the first device a first indication (3:4) indicating a wanted media object and a second indication (3:5) indicating a selected second device (304), the IPTV server sends (3:6)
(Continued)

a download instruction with a media reference to the selected second device. The download instruction instructs the second device to download and prebuffer (3:7) data of at least an opening part of the wanted media object based on the media reference. Thereby, a user can start playout of the wanted media object on the second device immediately without having to wait for session setup and downloading of enough data for playout.

20 Claims, 4 Drawing Sheets (51) Int. Cl.
| | |
|---|---|
| H04L 29/06 | (2006.01) |
| H04N 21/24 | (2011.01) |
| H04N 21/258 | (2011.01) |
| H04N 21/41 | (2011.01) |
| H04N 21/433 | (2011.01) |
| H04N 21/472 | (2011.01) |
| H04N 21/61 | (2011.01) |
| H04N 21/643 | (2011.01) |
| H04N 21/6543 | (2011.01) |
| H04N 21/658 | (2011.01) |
| H04N 21/858 | (2011.01) |
| H04N 21/231 | (2011.01) |
| H04N 21/2387 | (2011.01) |
| H04N 21/239 | (2011.01) |

(52) U.S. Cl.
CPC ..... *H04N 21/2387* (2013.01); *H04N 21/2393* (2013.01); *H04N 21/23106* (2013.01); *H04N 21/2407* (2013.01); *H04N 21/25833* (2013.01); *H04N 21/4126* (2013.01); *H04N 21/4331* (2013.01); *H04N 21/4334* (2013.01); *H04N 21/47202* (2013.01); *H04N 21/6125* (2013.01); *H04N 21/6175* (2013.01); *H04N 21/64322* (2013.01); *H04N 21/6543* (2013.01); *H04N 21/6581* (2013.01); *H04N 21/8586* (2013.01)

(58) Field of Classification Search
USPC .......................................................... 725/112
See application file for complete search history.

(56) References Cited

U.S. PATENT DOCUMENTS

| | | | | |
|---|---|---|---|---|
| 8,763,032 | B2* | 6/2014 | Hjelm | H04N 7/17318 725/100 |
| 8,949,923 | B2* | 2/2015 | Muvavarirwa | H04N 21/43615 370/332 |
| 8,955,030 | B2* | 2/2015 | Heie | H04N 7/163 386/200 |
| 8,973,063 | B2* | 3/2015 | Spilo | H04N 5/76 725/78 |
| 2007/0157281 | A1* | 7/2007 | Ellis | H04N 7/17309 725/134 |
| 2008/0235587 | A1* | 9/2008 | Heie | H04N 7/142 715/719 |
| 2008/0235733 | A1* | 9/2008 | Heie | H04N 7/163 725/46 |
| 2009/0125634 | A1 | 5/2009 | Virdi et al. | |
| 2009/0154387 | A1* | 6/2009 | Rogers | H04N 21/2381 370/312 |
| 2009/0158326 | A1* | 6/2009 | Hunt | G06F 3/04817 725/38 |
| 2010/0031299 | A1* | 2/2010 | Harrang | H04N 21/4104 725/80 |
| 2010/0057884 | A1* | 3/2010 | Brownell | H04N 7/17318 709/219 |
| 2010/0173585 | A1 | 7/2010 | Button et al. | |
| 2010/0251299 | A1* | 9/2010 | Scott | H04N 5/44543 725/39 |
| 2010/0333148 | A1* | 12/2010 | Musha | H04N 21/23406 725/81 |
| 2011/0047285 | A1* | 2/2011 | Kampmann | H04L 12/189 709/231 |
| 2011/0138413 | A1* | 6/2011 | Hjelm | H04N 7/17318 725/34 |
| 2011/0289537 | A1* | 11/2011 | Buehl | H04N 21/47202 725/98 |
| 2012/0198509 | A1* | 8/2012 | Arya | H04N 21/2365 725/118 |
| 2013/0125175 | A1* | 5/2013 | Hao | H04N 21/47202 725/62 |
| 2013/0212614 | A1* | 8/2013 | Reynolds | H04N 21/222 725/25 |
| 2013/0219426 | A1* | 8/2013 | Zweig | H04N 21/41407 725/32 |
| 2014/0013342 | A1* | 1/2014 | Swan | H04N 21/2343 725/5 |

FOREIGN PATENT DOCUMENTS

| | | |
|---|---|---|
| WO | 2008035943 A1 | 3/2008 |
| WO | 2011034474 A1 | 3/2011 |
| WO | 2011136703 A1 | 11/2011 |

OTHER PUBLICATIONS

Fasbender, A. et al. "Virtually at home: High-performance access to personal media" Ericsson Review No. 2, XP008146535, 2008, pp. 58-63.

* cited by examiner

METHOD AND IPTV SERVER FOR ENABLING PLAYOUT OF ONE OR MORE MEDIA OBJECTS

TECHNICAL FIELD

The present disclosure relates generally to a method and an IPTV server for enabling reception and playout of one or more media objects for a subscriber in a selected device.

BACKGROUND

In recent years, the concept of IPTV has been developed as an alternative or complement to traditional TV broadcasting. According to different IPTV services, a media object, e.g. a film or a TV program, can be either streamed or downloaded from a content provider to a user's equipment such as an STB (Set Top Box) or similar. When streamed to a receiving user equipment, the media object is played out at the same time as data is received, using a buffer mechanism to cater for slight variations in data throughput, also known as jitter. A media object can also be first downloaded and stored as a media file, to be played out at some point typically after the complete file or at least some playable part of the file has been downloaded.

Figure 1:
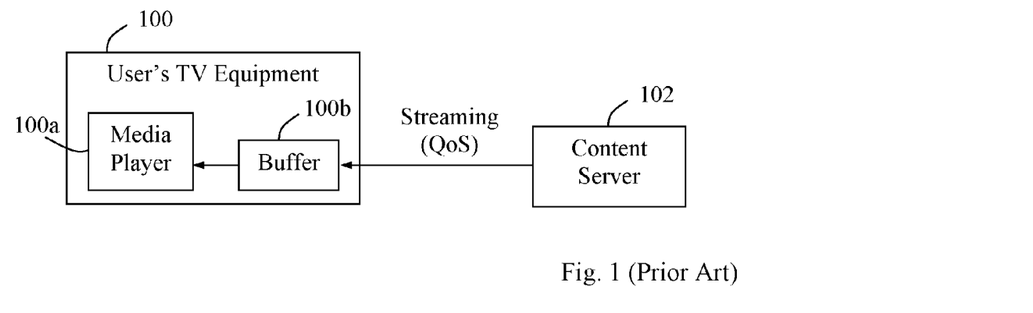
FIG. 1 is a communication scenario illustrating a streaming operation, according to the prior art.
Figure 2:
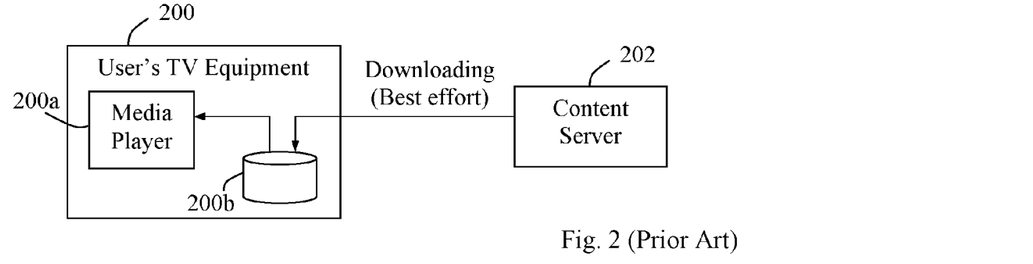
FIG. 2 is a communication scenario illustrating a downloading operation, according to the prior art.

FIG. 1 illustrates schematically that a user's TV equipment 100 receives media data of a media object from a content server 102 by means of streaming. The received media data is played out on a media player 100a after being buffered temporarily in a buffer unit 100b. The buffer time is typically less than a few seconds. Further, FIG. 2 illustrates downloading of a media file to a user's TV equipment 200 from a content server 202. The received media file is thus first stored in a media storage 200b and can then at some point be played out on a media player 200a, basically at any time. It is then up to the user to delete the media file from the media storage 200b, if not made automatically by the TV equipment after playout.

Different communication services are associated with different service or traffic classes for data transport in order to achieve a relevant Quality of Service (QoS) for each service. As indicated in FIG. 1, the streaming variant requires a certain QoS in terms of data throughput and latency in the transport network between content server 102 and TV equipment 100, to achieve a data transfer rate reasonably matching a "nominal" playout rate in media player 100a.

On the other hand, the downloading variant typically uses a service or traffic class generally referred to as "best effort", implying that the download rate is not critical and there is typically no guaranteed data throughput whatsoever, basically relying on what bandwidth is currently available in the transport networks after data sessions with higher priorities have been satisfied in the transport network(s). Nevertheless, it is typically possible to commence the playout from media storage 200b before the complete media file has been downloaded, as indicated above.

Using either of the mechanisms above, the user must wait after having selected a media object from a list of available media objects, until a session for media transfer from the content server 102, 202 has been established and at least some playable part of the media object has been transferred to the receiving TV equipment 100, 200. In the downloading case for example, during dense traffic in the transport network, it may take 30 minutes or even considerably longer before playout of the selected media object can commence, which is of course disturbing if the user wants to enjoy the media object immediately.

Further, if the data transfer rate is slower than the nominal playout rate such that media data is played out faster than received from the content server, all data in the buffer 100b or file storage 200b will eventually be consumed and the playout must be interrupted and suspended in order to receive more media data to play out. It can be readily understood that any such disturbance of the user's experience of watching the media object, including the wait for the playout to start and the interruptions during the playout, is a drawback. Another drawback is that the downloading requires large storage capacity in the user's equipment.

It is further a restriction that the downloading and streaming services of today requires that the media object is requested from the same device to which it will be downloaded for playout. For example, a user may want to enjoy a downloaded movie on a large TV equipment at home with high resolution and a powerful sound system. The user must then first get home and order the movie from that TV equipment and wait until enough data has been downloaded before the playout can commence, with a potential risk for interruptions due to slow data transfer and dense traffic in the transport network as explained above.

SUMMARY

It is an object of the invention to address at least some of the problems and issues outlined above. It is possible to achieve these objects and others by using a method and an IPTV server as defined in the attached independent claims.

According to one aspect, a method is provided in an IPTV server for enabling playout of one or more media objects for a subscriber. In this method, the IPTV server maintains a current connection state and capabilities of a set of devices which are associated to the subscriber. The IPTV server also sends a list of the set of devices, which list comprises current connection states of the devices, to a first device, e.g. when the first device communicates with the IPTV server in a browsing session or the like. The IPTV server then receives from the first device a first indication indicating a wanted media object, and a second indication indicating at least a second device selected out of the set of devices. In response thereto, the IPTV server sends a download instruction with a media reference of the wanted media object, to the selected second device. The download instruction instructs the second device to download and prebuffer data of at least an opening part of the wanted media object based on the media reference.

According to another aspect, an IPTV server is configured to enable playout of one or more media objects for a subscriber. The IPTV server comprises a maintaining unit adapted to maintain information on current connection state and capabilities of a set of devices associated to the subscriber. The IPTV server also comprises a first communication unit adapted to send a list of said set of devices to a first device, the list comprising current connection states of said set of devices. The first communication unit is also adapted to receive a first indication from the first device indicating a wanted media object, and to receive a second indication from the first device indicating at least a second device selected out of said set of devices. The IPTV server also comprises a second communication unit adapted to send a download instruction with a media reference of the wanted media object, to the selected second device. The download instruction instructs the second device to download and prebuffer data of at least an opening part of the wanted media object based on the media reference.

The above method and apparatus may be configured and implemented according to different optional embodiments. In one possible embodiment, the list of devices further includes information on their playout performance. In another possible embodiment, the received second indication further indicates at least a third device selected out of said set of devices. In that case, the IPTV server sends a download instruction to the at least third device.

The received first indication may indicate a plurality of wanted media objects, and the received second indication may indicate that each of the wanted media objects should be downloaded to a specific device out of the set of devices. In that case, the IPTV server may send download instructions with media references of different media objects to different devices according to the received second indication.

If the current connection state of the second device is non-connected, the IPTV server may queue the download instruction until the connection state of the second device becomes connected. Further, the media reference may be a Unified Resource Locator, URL pointing to the wanted media object in a content server, or a media identity which can be used to obtain the URL from the IPTV server.

In other possible embodiments, the IPTV server obtains the current connection state and capabilities of said set of devices in a login procedure for the devices at the IPTV server. The IPTV server may also send a status report to the first device indicating how much data has been downloaded to the selected device(s).

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable playout of one or more media objects for a subscriber on a selectable device, as controlled by means of an IPTV server. This solution enables a device user to browse for available media objects and select a media object in advance, e.g. when being away from home and using a portable device such as a mobile phone or a tablet, to be played out at a later point at home on another device such as a large TV equipment with high resolution and high quality sound.

In this description, the term "subscriber" is used to represent one or more users that can utilize an IPTV subscription for downloading and playing out media content on one or more devices associated to the subscription and hence also to the subscriber. The term "media object" further represents any media content that can be purchased or otherwise obtained by contacting an IPTV server, and "device" is used throughout for any user equipment that can communicate and perform as described here. The solution is thus not limited to the examples of mobile phone, tablet and TV equipment used in this description.

In this solution, a user uses a first device for browsing and selecting media content from the IPTV server, and then initiates such a download of a selected media object to another device being associated to the subscriber, here referred to as a second device. The user can thus effectively use the first device, e.g. a mobile phone, as a "remote control" at any location to browse available content and order one or more wanted media objects, and then select a second device on which playout is desired later on. The user can then go to the second device, e.g. a sophisticated TV equipment at home, to start the playout of the media object at a later point when data of at least an opening part of the media object has already been downloaded and prebuffered by the second device. Thereby, playout of the media object can start immediately upon receiving a play command, i.e. without the delays associated with the prior solutions discussed above. Further, enough data can be pre-buffered, depending on the total length of the media object, to prevent any interruptions due to slow download data rate such that the playout is finished before the buffer becomes empty.

In one possible example of employing this solution, a collection of media objects may first be selected by the user to become available for potential consumption at a later point, and only a limited opening part of each selected media object is downloaded to one or more selected "second" devices. Later, the user can select one of the downloaded media objects for playout from the second device which is able to start playout of the downloaded opening part of the selected media object while at the same time downloading the remaining part of the selected media object. The solution thus enables that the playout can start immediately and continue without interruption if enough data has been downloaded and prebuffered in advance. WO 2011/136703 A1 (Ericsson) describes how the size of an opening part of a media object can be calculated and pre-buffered depending on its total length and the available bandwidth, to avoid any interruptions due to empty buffer during subsequent playout. Further, it is also possible that the subscriber can be fully charged for the complete download only, while the opening parts of the selection of media objects can be downloaded and made available for free or at a very limited cost.

An example of using this solution will now be described with reference to actions in the communication scenario illustrated in FIG. 3. It should be noted that it is not necessary to perform the actions in this figure exactly in the shown order and some variations may occur depending on how the solution is implemented. A "subscriber", which could involve one or more persons or users, owns a first device 300, in this case a mobile phone, and at least a second device 304, which could be any type of device suitable for playout of media objects such as a TV equipment. The subscriber may also own any number of other devices, illustrated as one or more further devices 304a in the figure. It is assumed that these devices 304, 304a, forming a set of devices associated to the subscriber, have been registered as associated to the subscriber in an IPTV server 302 which provides IPTV services to the subscriber such that media objects can be ordered and purchased from the IPTV server 302 which then sends a download instruction to any of the subscriber's devices chosen for playout.

The shown procedure basically starts when at least the second device 304 is powered on or otherwise activated and thereby logs in to the IPTV server 302 and enters a "connected" state, in an action 3:1a. The other devices 304a may likewise be powered on and log in to the IPTV server 302 to enter the connected state, not shown. Another action 3:1b illustrates schematically that the IPTV server 302 maintains a current connection state, i.e. either connected or non-connected, and capabilities of the set of devices 304, 304a associated to the subscriber.

Thus, the second and third devices 304, 304a will be registered in connected state once they log in to the IPTV server 302. A device can also be registered to have entered the non-connected state e.g. when a disconnection message or the like is received from the device or when a timeout is reached without receiving any activity from the device. The capabilities of the devices may, without limitation, comprise information on their codecs, resolution, storage space and so-called "CA/DRM" rights i.e. authorization to download, which is maintained as information on the devices' ability and capacity for making any forthcoming downloading operations.

The above term CA/DRM stands for Conditional Access/Digital Rights Management, and different devices might have different conditional access systems and or digital rights management systems. For example, some media objects can only be downloaded in encrypted form and any devices lacking decryption ability cannot be used for the playback.

Next, a user operates the first device 300 and starts e.g. a browser or a suitable application therein which connects to the IPTV server 302 in order to browse for media objects, shown by an action 3:2. Thereby, the user can find out which media objects, e.g. movies and TV programs, are available for downloading. The IPTV service provided by IPTV server 302 may thus offer a selection of media objects that can be chosen for downloading for its subscribers. This solution allows the user of device 300 to choose any number of media objects for downloading of a least an opening part to another device. Even though the solution is mostly described in terms of downloading a single, or "a", media object, it should be readily understood that the described procedure can also be applied for the case of downloading multiple media objects.

Further, the IPTV server 302 sends a list of said set of devices 304, 304a associated to the subscriber to the first device 300, the list comprising at least current connection states of the devices, shown as another action 3:3. For example, the list may indicate the second device 304 as being in a connected state, having logged in to the server 302 in action 3:1a, while the other devices 304a may be indicated in the list as being in either connected or non-connected state depending on whether they have logged in or not. The list of devices may further include information on their playout performance, e.g. in terms of resolution and quality.

Thereby, the user is able to also choose which one of the devices in the list to use for downloading and enjoying a particular selected movie or TV program, depending on its connection state and optionally also its playout performance. This solution also allows the user to select more than one device for downloading such that different media objects can be downloaded to different devices or the same media object(s) can be downloaded to plural selected devices, and so forth.

A further action 3:4 illustrates that when the user selects a media object, from the browsed available media objects, the first device 300 sends a first indication indicating a wanted media object, to the IPTV server 302. Another action 3:5 illustrates that when the user also selects the second device 304 to make the downloading, which device was indicated as being in connected state in the above list, the first device 300 sends a second indication indicating at least the second device selected out of the set of devices, to the IPTV server 302. The second indication may further indicate at least a third device, or any number of devices, selected out of the set of devices. Even though sending the first and second indications are described as two separate actions in this context for clarity, they can be sent to the IPTV server 302 at the same time as well, e.g. in a suitable joint message.

Having received the above first and second indications from the first device 300, the IPTV server 302 accordingly sends a download instruction to the selected second device 304, in an action 3:6, the download instruction comprising a media reference of the wanted media object. The download instruction is configured to effectively instruct the second device 304 to download and prebuffer data of at least an opening part of the wanted media object based on the media reference. The "media reference" in this context may be a Unified Resource Locator, URL or the like pointing directly to the media object in a content server 306. Alternatively, the media reference may be an identifier of the media object, "object ID", which the second device 304 can use to retrieve the URL from the IPTV server, not shown here.

In this solution, it is possible for the user to download just the opening part of one or more media objects to at least the second device, e.g. for free or at a reduced price, and then when operating the second device later on decide whether to consume the complete media object(s) or not. If so, the remainder of a started media object will be downloaded at the same time the pre-buffered opening part thereof is played out, which means that the user can be charged for purchasing the complete media object. In this way, the opening part of any number of media objects will be readily available for immediate playout without having to download and store them all completely.

Figure 3:
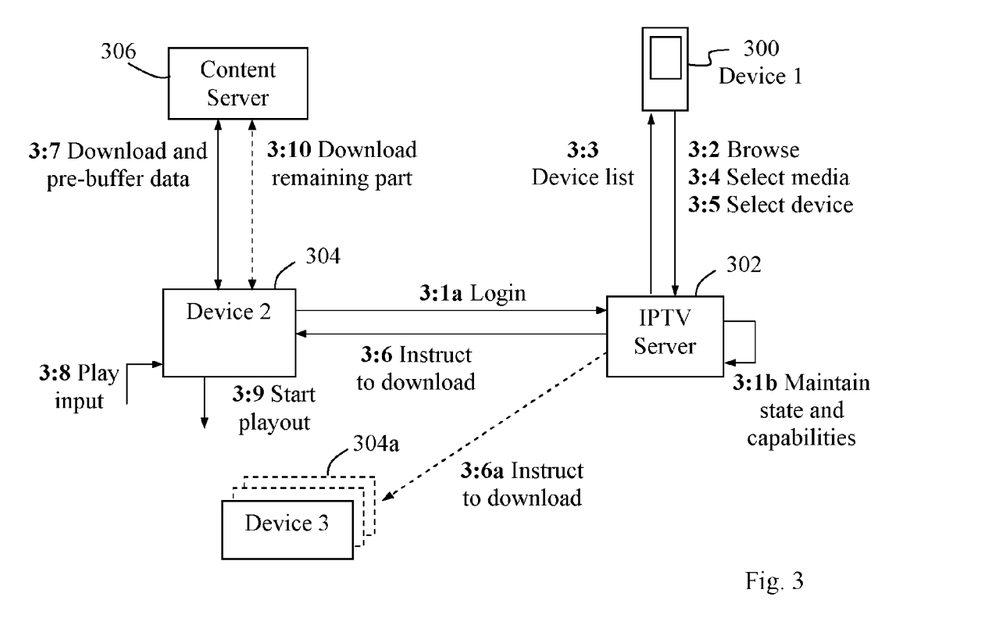
FIG. 3 is a communication scenario illustrating how an IPTV server can be used for enabling playout of a media object for a subscriber, according to some possible embodiments.

Returning to the procedure of FIG. 3, the IPTV server 302 may likewise send a similar download instruction to any number of other selected devices, as shown in an action 3:6a. In a next action 3:7, the second device 304 follows the received download instruction by downloading and prebuffering data of at least an opening part of the wanted media object based on the media reference, which could be an explicit URL or an implicit object ID as mentioned above. For example, the second device 304 may first calculate the size of the opening part to prebuffer as described in the above-mentioned WO 2011/136703 A1, to ensure that the complete media object can be played out without interruptions, the details of which being however somewhat outside the scope of this solution which is rather implemented in the IPTV server.

At some point later, e.g. when the user gets to the location of the second device 304 and wants to enjoy the previously selected and ordered media object, the second device 304 receives a play command as input from the user to start the media object, in an action 3:8. Having already downloaded and prebuffered at least the opening part of the media object in action 3:7, the second device 304 is able to start the playout of the object immediately, in another action 3:9. During the playout, the second device 304 downloads the remaining part of the media object, if any, in a further action 3:10.

In this procedure, different solutions for executing a purchase of the media object can be employed. One option is to make the purchase and trigger charging thereof already when the media object is effectively ordered by means of actions 3:4 and 3:5, i.e. when the IPTV server 302 receives the above-described first and second indications from the first device 300, indicating the wanted media object(s) and the device(s) 304, 304a selected for downloading, respectively. In this case, the IPTV server 302 will trigger the charging.

Another option is to complete the purchase and trigger charging thereof once the second device 304 actually downloads data as of action 3:7, either the complete media object or just an opening part thereof. Further options include to trigger charging of the purchase not until the user either starts the playout, e.g. if the complete media object has been downloaded before playout, or when the second device 304 downloads data of the remaining part as of action 3:10, provided that only the opening part was downloaded initially in action 3:7. In the latter case, the content server 306 can trigger the charging. The procedure as such for triggering and executing the charging in any of the above cases is however outside the scope of this solution.

Figure 4:
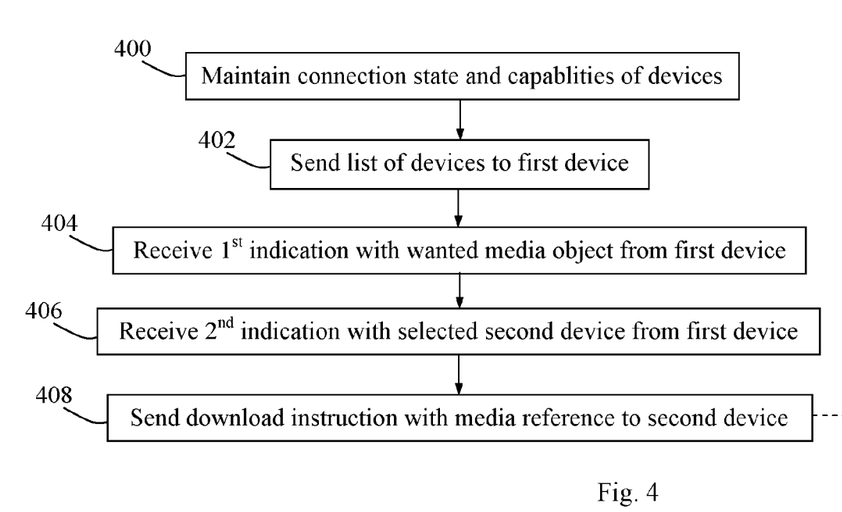
FIG. 4 is a flow chart illustrating a procedure in an IPTV server, according to further possible embodiments.

A procedure in an IPTV server for enabling playout of one or more media objects for a subscriber, will now be described with reference to the flow chart in FIG. 4, illustrating actions executed in the IPTV server. The IPTV server 302 described for FIG. 3 may be used also in the procedure of FIG. 4.

In a first action 400, the IPTV server maintains a current connection state and capabilities of a set of devices associated to the subscriber, basically corresponding to action 3:1b in FIG. 3. As in the above example, the current connection state may be either connected or non-connected, and the maintained capabilities may refer to various technical specifications of each device such as codecs, resolution, storage space, CA/DRM" rights, and so forth. For example, the IPTV server may obtain the current connection state and capabilities of the set of devices in a login procedure for the devices at the IPTV server, e.g. as shown by action 3:1a in FIG. 3.

The IPTV server further sends a list of the set of devices to a first device, in an action 402 basically corresponding to action 3:3 in FIG. 3, e.g. when a user of the first device is looking for available media objects in a browsing session. The list of devices comprises current connection states of the set of devices, and optionally also includes information on their playout performance.

When the user has decided which media object(s) he/she wants to download, the IPTV server receives a first indication indicating a wanted media object from the first device, in an action 404 basically corresponding to action 3:4 in FIG. 3. The first indication is triggered in the first device by a suitable object selection command from the user, which as such is outside the scope of this solution.

When the user has decided a device to which he/she wants to download the chosen media object(s), the IPTV server receives a second indication indicating at least a second device selected out of the set of devices, from the first device, in an action 406 basically corresponding to action 3:5 in FIG. 3. In this action, the user may have selected more than one device associated to the subscriber, e.g. at least a "third" device, as described above. If the user wants to download a plurality of media objects to a plurality of devices, the received second indication may further indicate that each of the wanted media objects should be downloaded to a specific device out of the set of devices.

The second indication is triggered in the first device by another suitable device selection command from the user, which as such is likewise outside the scope of this solution. Analogous with the example of FIG. 3, actions 404 and 406 may be merged into one action by receiving the first and second indications in the same message from the first device.

A final shown action 408 indicates that the IPTV server accordingly sends a download instruction with a media reference of the wanted media object, to the selected second device, and optionally also to any other devices indicated in the received second indication, basically corresponding to actions 3:6, 3:6a in FIG. 3. The download instruction instructs the second device to download data of at least an opening part of the wanted media object from a content server based on the media reference, and to prebuffer the downloaded data.

If the current connection state of the second device is non-connected, the download instruction may be queued until the connection state of the second device becomes connected. In the case when the user wants to download a plurality of media objects to a plurality of devices as specified in the second indication, the IPTV server may send download instructions with a media reference of each media object to different devices according to the received second indication. In addition, the IPTV server may send a status report to the first device indicating how much data has been downloaded to the selected device(s), e.g. after obtaining such information from the devices or from the content server.

Figure 4A:
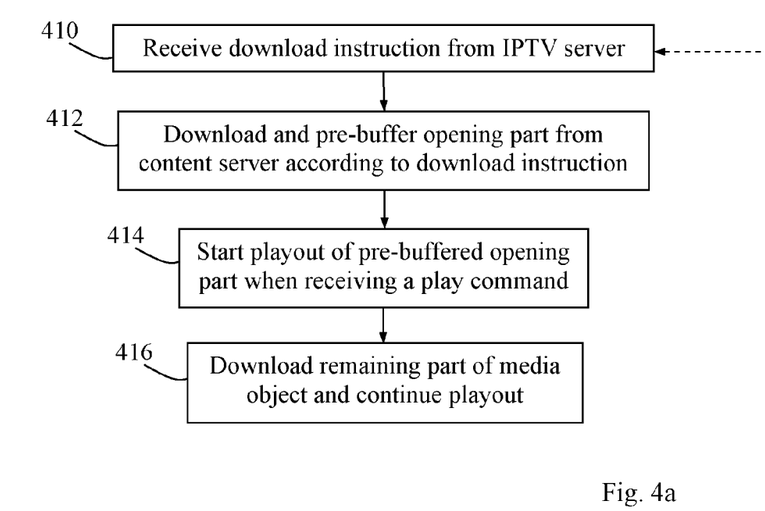
FIG. 4a is a flow chart illustrating a procedure in a device when receiving a download instruction from the IPTV server of FIG. 4.

FIG. 4a is a flow chart with possible actions in a device when receiving a download instruction from the IPTV server according to this solution, such as the second device 304 in FIG. 3, which will be briefly outlined below. The flow chart in FIG. 4a can thus be seen as a continuation of the flow chart in FIG. 4 such that its first action 410 of receiving the download instruction from the IPTV server basically coincides with action 408 above. In another action 412, the device downloads and pre-buffers an opening part of the media object from a content server according to the received download instruction, basically corresponding to action 3:7 in FIG. 3.

In a further action 414, the device receives a play command from the user and accordingly starts playout of the prebuffered opening part of the media object basically corresponding to action 3:8 in FIG. 3. A final action 416 illustrates that the device then downloads the remaining part of the media object from the content server while continuing the playout, basically corresponding to actions 3:8, 3:10 in FIG. 3.

Figure 5:
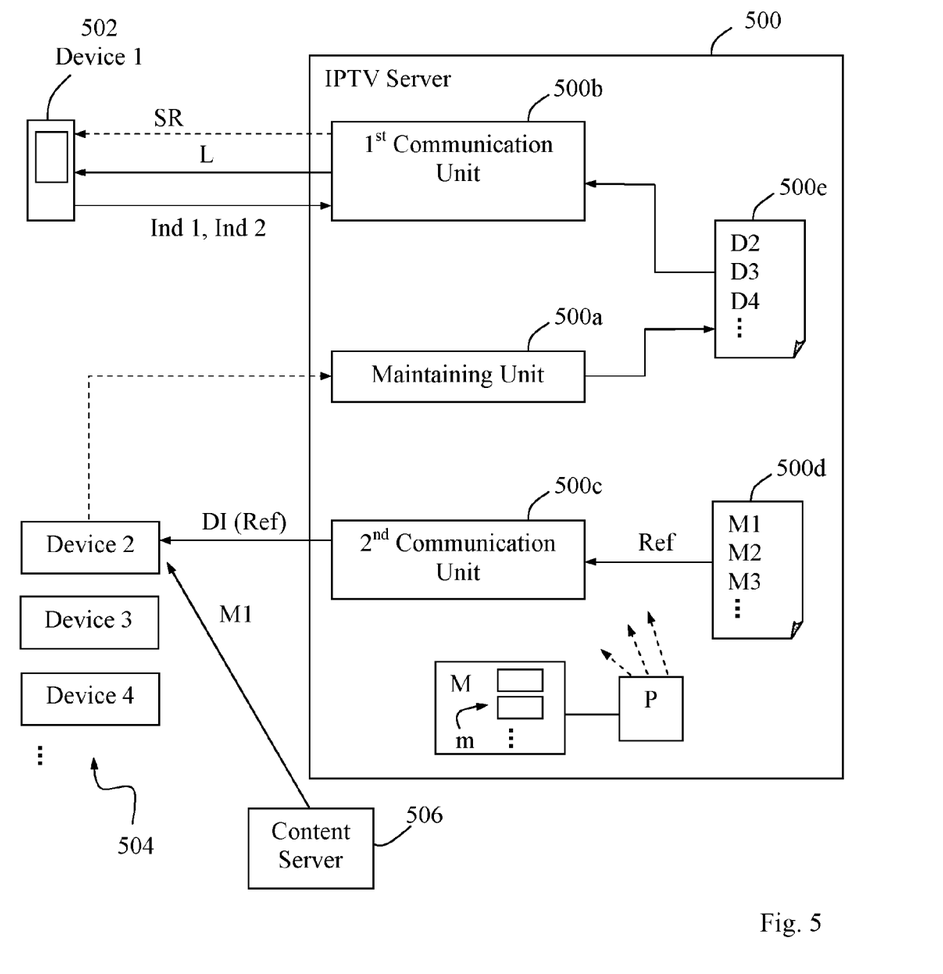
FIG. 5 is a block diagram illustrating an IPTV server in more detail, according to further possible embodiments.

A detailed but non-limiting example of how an IPTV server can be configured to accomplish the above-described solution, is illustrated by the block diagram in FIG. 5. The IPTV server 500 is configured to enable playout of one or more media objects for a subscriber, e.g. according to the procedures described above for any of FIGS. 3-4, respectively. The IPTV server 500 will now be described in terms of a possible example of employing the solution where a first device 502 and a set of further devices 504 are associated to the subscriber. It is assumed that the IPTV server 500 has stored information on a collection 500d of media objects M1, M2, M3, . . . on offer which can be browsed by subscribing users.

The IPTV server 500 comprises a maintaining unit 500a adapted to maintain information 500e on current connection state and capabilities of the set of devices 504 associated to the subscriber. The IPTV server 500 also comprises a first communication unit 500b adapted to send a list "L" of the set of devices to the first device 502. The list L comprises current connection states of the devices 504 and optionally also information on their playout performance. The first communication unit 500b is also adapted to receive a first indication "Ind 1" from the first device 502 indicating a wanted media object, and to receive a second indication "Ind 2" from the first device indicating at least a second device "2" selected out of the set of devices 504.

The IPTV server 500 also comprises a second communication unit 500c adapted to send a download instruction "DI" with a media reference "Ref" of the wanted media object, to the selected second device, the media reference "Ref" being obtained from the stored information 500d on the media objects. The download instruction instructs the second device to download at least an opening part of the wanted media object from a content server 506 based on the media reference Ref, and to prebuffer data of at least the opening part of the wanted media object. As described in the previous examples, the media reference may be a URL pointing to the wanted media object in the content server 506. Alternatively, the media reference could be a media identity which can be used to obtain the URL from the IPTV server that points to the wanted media object in the content server 506.

The above IPTV server 500 and its functional units 500a-c may be configured or adapted to operate according to various optional embodiments. In one possible embodiment, if the received second indication further indicates at least a third device selected out of the set of devices, the second communication unit 500c may be further adapted to send a download instruction to the at least third device.

As mentioned in the previous examples, the received first indication may indicate a plurality of wanted media objects and the received second indication may indicate that each of the wanted media objects should be downloaded to a specific device out of the set of devices. In that case, the second communication unit 500c may be further adapted to send download instructions with media references of different media objects to the different devices according to the received second indication.

In another possible embodiment, if the current connection state of the second device is non-connected, the second communication unit 500c may be further adapted to queue the download instruction until the connection state of the second device becomes connected.

In further possible embodiments, the maintaining unit 500a may be further adapted to obtain the current connection state and capabilities of the set of devices in a login procedure for the devices at the IPTV server. The first communication unit 500b may also be adapted to send a status report "SR" to the first device indicating how much data has been downloaded to the selected device(s).

It should be noted that FIG. 5 illustrates various functional units in the IPTV server 500 and the skilled person is able to implement these functional units in practice using suitable software and hardware means. Thus, this aspect of the solution is generally not limited to the shown structures of the IPTV server 500, and the functional units 500a-c may be configured to operate according to any of the features described in this disclosure, where appropriate.

The functional units 500a-c described above can be implemented in the IPTV server 500 by means of program modules of a respective computer program comprising code means which, when run by processors "P" causes the IPTV server 500 to perform the above-described actions. Each processor P may comprise a single Central Processing Unit (CPU), or could comprise two or more processing units. For example, each processor P may include general purpose microprocessors, instruction set processors and/or related chips sets and/or special purpose microprocessors such as Application Specific Integrated Circuits (ASICs). Each processor P may also comprise a storage for caching purposes.

Each computer program may be carried by a computer program product "M" in the IPTV server 500 in the form of a memory having a computer readable medium and being connected to the processor P. Each computer program product M or memory thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the IPTV server 500.

Figure 6:
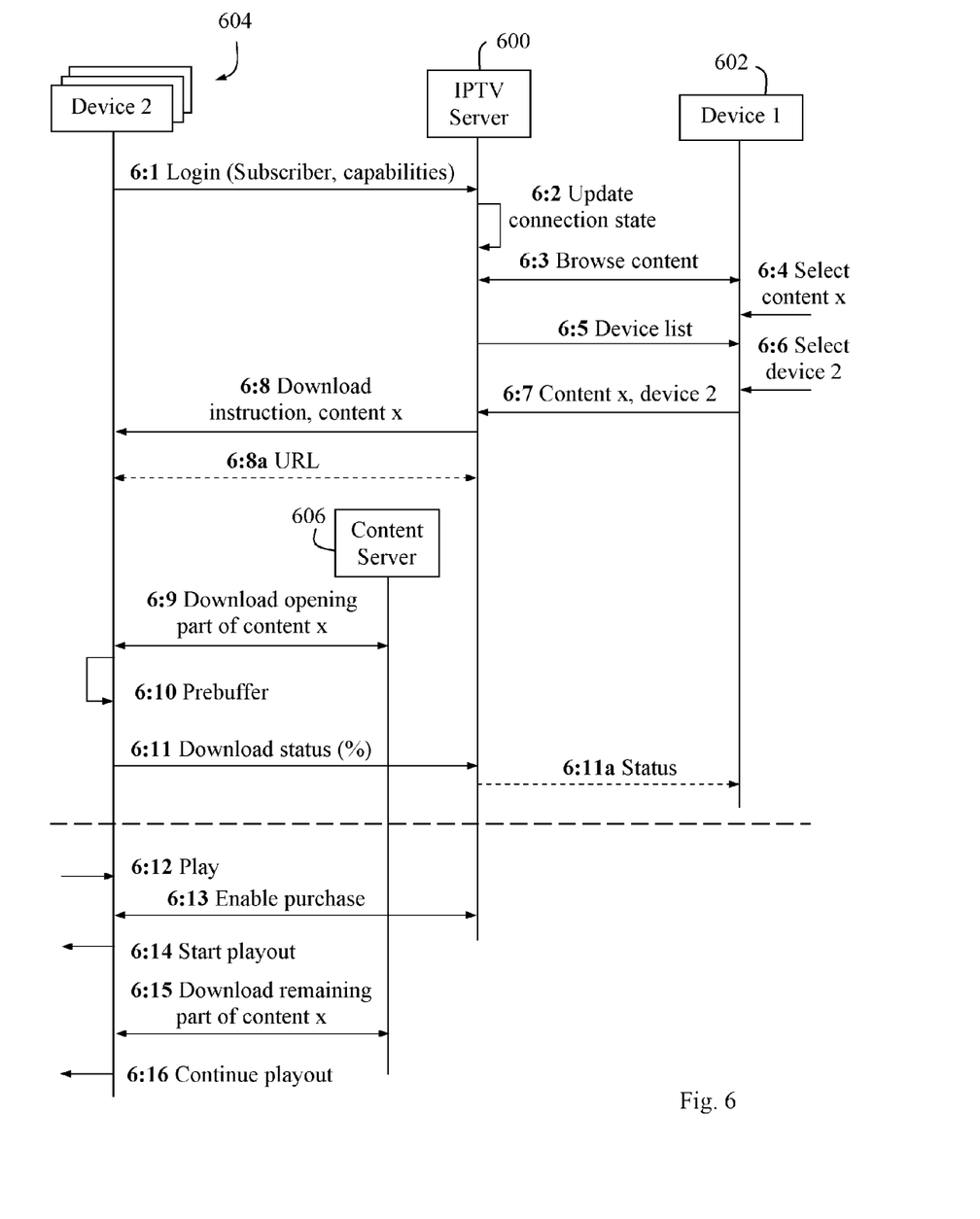
FIG. 6 is a signalling diagram illustrating a detailed example of a procedure when the solution is used, according to further possible embodiments.

Another more detailed example of how the solution can be used in practice for enabling playout of one or more media objects for a subscriber, will now be described with reference to the signalling diagram in FIG. 6. This procedure involves an IPTV server 600, a first device 602, a set of further devices 604 associated to the subscriber, and a content server 606. It should be noted that it is not necessary to always execute the actions and messages in FIG. 6 strictly in the shown order and some variations may be employed, e.g. as exemplified below.

A first shown action 6:1 illustrates that one or more of the devices 604 logs in to the IPTV server 600 and thereby enters a "connected" state. Another action 6:2 illustrates that the IPTV server 600 updates the connection state for the logged in device(s) accordingly. The first device is then operated by a user and performs a browsing session with the IPTV server 600 in an action 6:3, when the user browses for content, i.e. media objects available for downloading. A next action 6:4 illustrates that the user selects some content "x" in the form of one or more media objects. The IPTV server 600 also sends a list of the devices 604 to the first device 602 in another action 6:5, from which the user further selects a second device, shown as an action 6:6.

The above actions 6:3-6:6 may be performed in different possible ways. For example, the device list may be sent during the browsing session such that actions 6:3 and 6:5 are basically merged. Further, the user may select content and the second device at the same time such that actions 6:4 and 6:6 are also basically merged. Once the user has selected content and second device, the first device 602 sends the above-described first and second indications indicating the selected content x and the second device 604, respectively, to the IPTV server 600 in an action 6:7.

Having received the first and second indications from device 602, the IPTV server 600 accordingly sends a download instruction for downloading content x to the selected second device 604, in another action 6:8. The download instruction comprises a media reference, e.g. an explicit URL or an implicit object ID that the device 604 can use to obtain the URL from IPTV server 600, as indicated by a dashed two-way arrow in action 6:8a. Analogous with the above examples, the URL points to the selected content x, or media object(s), in the content server 606.

Having received the download instruction from IPTV server 600, the second device 604 accordingly downloads an opening part of the content x from content server 606, in another action 6:9, and prebuffers the downloaded opening part, in a further action 6:10. The downloading operation may use the HyperText Transfer Protocol, HTTP, or any other protocol that could be useful in this context. The second device 604 may also provide a download status to the IPTV server 600, in a further action 6:11, indicating how much data of content x has been downloaded so far. Thereby, the IPTV server 600 is able to send a corresponding status report to the first device 602, in another action 6:11a, to inform the user that content x, and possibly any other media objects that have been likewise downloaded, is now ready for playout on the second device 604.

At some point later, schematically suggested by the dashed horizontal separation line, the second device 604 receives a play command in action 6:12 from a user, who could be the same user having operated the first device 602 or another user, for playing out the content x. At this point, a dialogue is executed with the IPTV server 600, in an action 6:13, to enable a purchase of the content x, which effectively allows the user to start playout and download a remaining part of content x. The purchase dialogue as such is somewhat outside the scope of this solution and is therefore not necessary to describe any further.

Finally, the second device is able to start the playout in action 6:14 and to download the remaining part of content x in an action 6:15 while continuing the playout in a final shown action 6:16. It should be noted that action 6:13 may be executed at any time during the course of actions 6:14-6:16.

While the solution has been described with reference to specific exemplary embodiments, the description is generally only intended to illustrate the inventive concept and should not be taken as limiting the scope of the solution. For example, the terms "media object", "device", "indication", "media reference", and "download instruction" have been used throughout this description, although any other corresponding nodes, functions, and/or parameters could also be used having the features and characteristics described here. The solution is defined by the appended claims.

The invention claimed is:

1. A method, in an Internet Protocol Television (IPTV) server, for enabling playout of one or more media objects for a subscriber, the method comprising:
   maintaining current connection states and capabilities of a set of devices associated with the subscriber;
   sending a list of the set of devices to a first device, the list comprising the current connection states of the set of devices, wherein the first device is located remotely from the set of devices;
   receiving a first indication from the first device, the first indication indicating a wanted media object;
   receiving a second indication from the first device, the second indication indicating at least a second device selected out of the set of devices;
   sending a download instruction, with a media reference of the wanted media object, to the selected second device, the download instruction instructing the second device to download and pre-buffer data of an opening part of the wanted media object based on the media reference;
   sending a third indication to the first device, the third indication indicating that the pre-buffer data of the wanted media object is ready for the playout on the second device; and
   receiving a request from the second device to enable the playout of the pre-buffer data, and download a remaining part of the wanted media object during the playout of the pre-buffer data.

2. The method of claim 1, wherein the list of the set of devices further comprises information on their playout performance.

3. The method of claim 1:
   wherein the received second indication further indicates at least a third device selected out of the set of devices;
   further comprising sending another download instruction to the third device.

4. The method of claim 1, wherein the received first indication indicates a plurality of wanted media objects.

5. The method of claim 4:
   wherein the received second indication indicates that each of the wanted media objects should be downloaded to a specific device out of the set of devices;
   sending respective download instructions with media references of different media objects to different devices according to the received second indication.

6. The method of claim 1, further comprising, in response to receiving a disconnection message from the second device, registering the current connection state of the second device as being non-connected, and queuing the download instruction until the connection state of the second device becomes connected.

7. The method of claim 1, wherein the media reference is a Unified Resource Locator (URL) pointing to the wanted media object in a content server.

8. The method of claim 1, wherein the media reference is a media identity which can be used to obtain a Unified Resource Locator (URL) from the IPTV server, the URL pointing to the wanted media object in a content server.

9. The method of claim 1, wherein the current connection states and capabilities of the set of devices are obtained in a login procedure for each of the set of devices at the IPTV server.

10. The method of claim 1, further comprising obtaining a status report from the second device or from a content server indicating how much data has been downloaded to the second device, and sending the status report to the first device.

11. An Internet Protocol Television (IPTV) server configured to enable playout of one or more media objects for a subscriber, the IPTV server comprising:
   one or more processing circuits to:
      maintain information on current connection states and capabilities of a set of devices associated with the subscriber;
      send a list of the set of devices to a first device, the list comprising the current connection states of the set of devices, wherein the first device is located remotely from the set of devices;
      receive a first indication from the first device indicating a wanted media object;
      receive a second indication from the first device indicating at least a second device selected out of the set of devices;
      send a download instruction, with a media reference of the wanted media object, to the selected second device, the download instruction instructing the second device to download and pre-buffer data of an opening part of the wanted media object based on the media reference;

send a third indication to the first device, the third indication indicating that the pre-buffer data of the wanted media object is ready for the playout on the second device; and receive a request from the second device to enable the playout of the pre-buffer data, and download a remaining part of the wanted media object during the playout of the pre-buffer data.

12. The IPTV server of claim 11, wherein the list of the set of devices further includes information on their playout performance.

13. The IPTV server of claim 11:
wherein the received second indication further indicates at least a third device selected out of the set of devices;
wherein the one or more processing circuits further send another download instruction to the third device.

14. The IPTV server of claim 11, wherein the received first indication indicates a plurality of wanted media objects.

15. The IPTV server of claim 14:
wherein the received second indication indicates that each of the wanted media objects should be downloaded to a specific device out of the set of devices;
wherein the one or more processing circuits further send download instructions with media references of different media objects to different devices according to the received second indication.

16. The IPTV server of claim 11, wherein the one or more processing circuits, in response to receiving a disconnection message from the second device, register the current connection state of the second device as being non-connected, and queue the download instruction until the connection state of the second device becomes connected.

17. The IPTV server of claim 11, wherein the media reference is a Unified Resource Locator (URL) pointing to the wanted media object in a content server.

18. The IPTV server of claim 11, wherein the media reference is a media identity which can be used to obtain a Unified Resource Locator (URL) from the IPTV server, the URL pointing to the wanted media object in a content server.

19. The IPTV server of claim 11, wherein the one or more processing circuits further obtain the current connection state and capabilities of the set of devices in a login procedure for each of the set of devices at the IPTV server.

20. The IPTV server of claim 11, wherein the one or more processing circuits further obtain a status report from the second device or from a content server indicating how much data has been downloaded to the second device, and send the status report to the first device.

* * * * *